Dec. 10, 1963 W. J. GREENE 3,114,101

ANALOGUE-CONTROLLED AMPLIFIER

Filed Sept. 22, 1960 5 Sheets-Sheet 1

INVENTOR
W. J. GREENE
BY Leslie C. Bryan
ATTORNEY

ANALOGUE-CONTROLLED AMPLIFIER

Filed Sept. 22, 1960 5 Sheets-Sheet 2

INVENTOR
W. J. GREENE
BY
Leslie G. Byer
ATTORNEY

ANALOGUE-CONTROLLED AMPLIFIER

Filed Sept. 22, 1960 5 Sheets-Sheet 3

INVENTOR
W. J. GREENE
BY
Leslie C. Byer
ATTORNEY

ANALOGUE-CONTROLLED AMPLIFIER

Filed Sept. 22, 1960 5 Sheets-Sheet 4

INVENTOR
W. J. GREENE
BY
Leslie C. Byer
ATTORNEY

Dec. 10, 1963 W. J. GREENE 3,114,101

ANALOGUE-CONTROLLED AMPLIFIER

Filed Sept. 22, 1960 5 Sheets-Sheet 5

INVENTOR
W. J. GREENE
BY
Leslie C. Byer
ATTORNEY

United States Patent Office 3,114,101
Patented Dec. 10, 1963

1 2

3,114,101

ANALOGUE-CONTROLLED AMPLIFIER

William J. Greene, Scotch Plains, N.J., assignor to Air Reduction Company, Incorporated, New York, N.Y., a corporation of New York Filed Sept. 22, 1960, Ser. No. 57,736
8 Claims. (Cl. 323—66)

This invention relates to regulated power supplies and more particularly to negative feedback systems for controlling such power supplies.

An object of the invention is to avoid instability or oscillations in the feedback system due to material time delay in the response of the power supply to a demand for a change in power output, without at the same time increasing the time required for the power supply to change from one value of power output to another under the control of the feedback system, that is, without sacrificing the ability to follow rapid changes in demand for power (or, what is the same thing, decreasing the frequency width of the pass band of the system).

The invention is particularly applicable to the combination of a magnetic amplifier and a regulating feedback system therefor, due to the usual inherent dead time or delay in the response of the output of the magnetic amplifier to changes in the input of the magnetic amplifier.

The invention is described and shown herein in connection with an illustrative embodiment in welding equipment but it is to be understood that the invention is not limited to welding or the like.

For the control of the output current of the power supply, a program wave, reference wave or input signal is supplied to the system from any suitable source. The input signal may be constant or may vary as a function of time in any desired manner so as to control a program of operation. Two separate feedback signals are derived from the load circuit to which the power supply is connected. One of these feedback signals, referred to herein as the current feedback, is a voltage proportional to the load current and may be considered as equivalent to a voltage drop in a fictitious or equivalent resistance R in the load circuit. The other feedback signal, referred to herein as the voltage feedback, is proportional to the voltage drop across a serial combination of the equivalent resistance R and a resistance $R_L$, the latter being the resistance of the load device, for example, the electric arc in a welding system. In this serial combination, the voltage across the resistance R in effect is opposite in polarity to the voltage across the resistance $R_L$.

Since both the current feedback and the voltage feedback are delayed by the dead time of the power supply, analogue circuits are provided to supply transient feedback signals during the dead time. One analogue circuit is a charging and discharging circuit having the same value of time constant as the portion of the actual equivalent load circuit comprising the resistance R and a smoothing inductance L. The other analogue circuit takes account of the difference between $R_L$ and R and serves to convert a voltage that is proportional to R into a voltage proportional to $R_L$ minus R.

The current feedback is compared with the input signal as in a differential amplifier, the differential output being used to provide an input to the control element of the power supply to initiate a change in state of the power supply whenever the signal input and the current feedback are not equal. The differential output is also used to charge or discharge the first-mentioned analogue circuit. This circuit charges or discharges at the same rate as will the actual load circuit when the current in the load circuit begins to change at the end of the dead time, thereby anticipating the successive current values in the load circuit. During the dead time, the analogue circuit regulates the controlling input to the power supply in such manner as to insure a rapid change of the load current from the old value to the demanded new value, which change will take effect immediately upon the expiration of the dead time. Then the current feedback from the actual load circuit comes into play and is impressed upon the differential amplifier in place of the transient current feedback, the transient feedback being automatically shut off by the appearance of the feedback from the actual load circuit.

The current feedback determines two components of input voltage to be applied to the control system of the power supply, namely the component required to build up current in the smoothing inductance L and the component to provide the output voltage drop across the resistance R. The voltage feedback determines a third component of input voltage to be supplied to the control system of the power supply, which component provides a voltage drop across the resistance $R_L$ minus R. These three components are summed in a suitable combining circuit from which the resultant voltage is impressed upon the control circuit of the power supply.

The transient voltage feedback is provided by taking an output from the charge and discharge analogue circuit and passing it through the $R_L$–R analogue circuit. In order to cut off the transient voltage feedback signal at the end of the dead time, a delay circuit having a delay time equal to the dead time is provided. The transient voltage feedback signal is sent both directly to the combining circuit to combine with the transient current feedback signal, and indirectly through the delay circuit. At the end of the dead time these two signals cancel each other out and the voltage feedback signal from the actual load circuit then takes over.

With stabilizing procedures described herein, the feedback signals are effectively advanced through a phase angle corresponding to the dead time, thus imparting stable negative feedback characteristics to the system over a relatively wide frequency band, e.g., from zero to one hundred cycles per second.

An illustrative field of use of the invention is in spot welding thin sheets by electric arc methods. This application may call for a program of raising the current suddenly to preheat level, then gradually raising the heat to a welding level, followed by reduction to a post-heat level, and finally tapering off to zero for crater fill. The entire program may have to be completed in a period of a few tenths of a second. Accurate reproduction of the function representing a program of this sort may require a band pass extending from zero to eighty cycles per second or higher. The electric arc is not only a nonlinear load impedance but also exhibits a negative resistance characteristic in the low current range. Conventional stabilization procedures used with arc loads require the insertion of added series resistance in the load circuit to produce a net positive load circuit resistance. Dead time simulation, as described herein, results in stable operation even when the net load circuit resistance is negative. Other features, objects and advantages will appear from the following more detailed description of an illustrative embodiment of the invention, which will now be given in conjunction with the accompanying drawings.

In the drawings,

FIG. 1 shows how FIGS. 1*a*, 1*b* and 1*c* are to be arranged to form a detailed schematic diagram of a magnetic amplifier and accompanying rectifying and filtering circuits together with a compound feedback circuit for the control of the magnetic amplifier in accordance with the invention;

FIGS. 1*a*, 1*b* and 1*c* are the component parts of the composite drawing represented in FIG. 1;

Figure 1A:
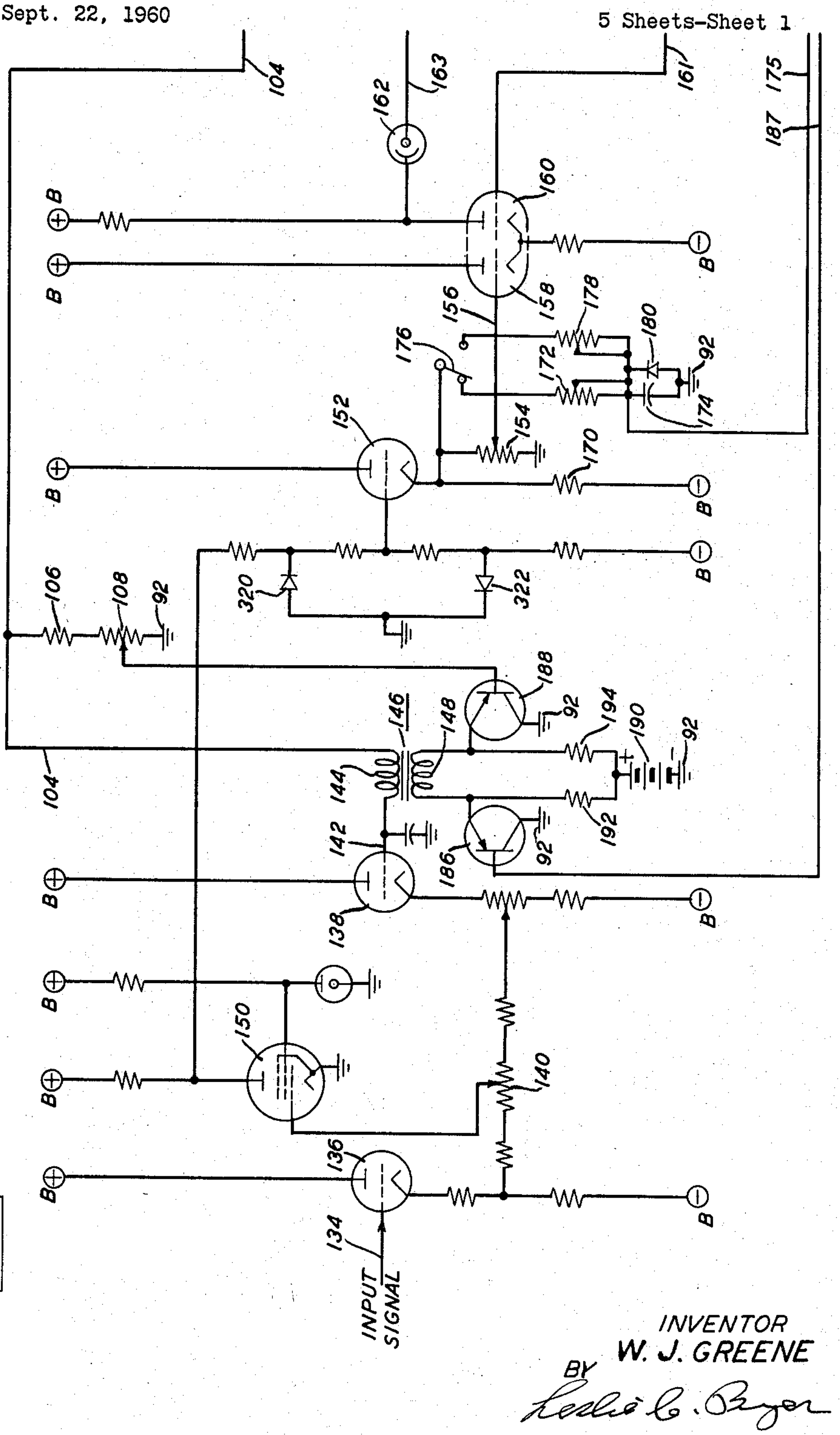
Figure 1:
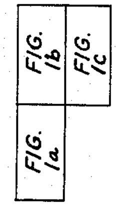
Figure 1B:
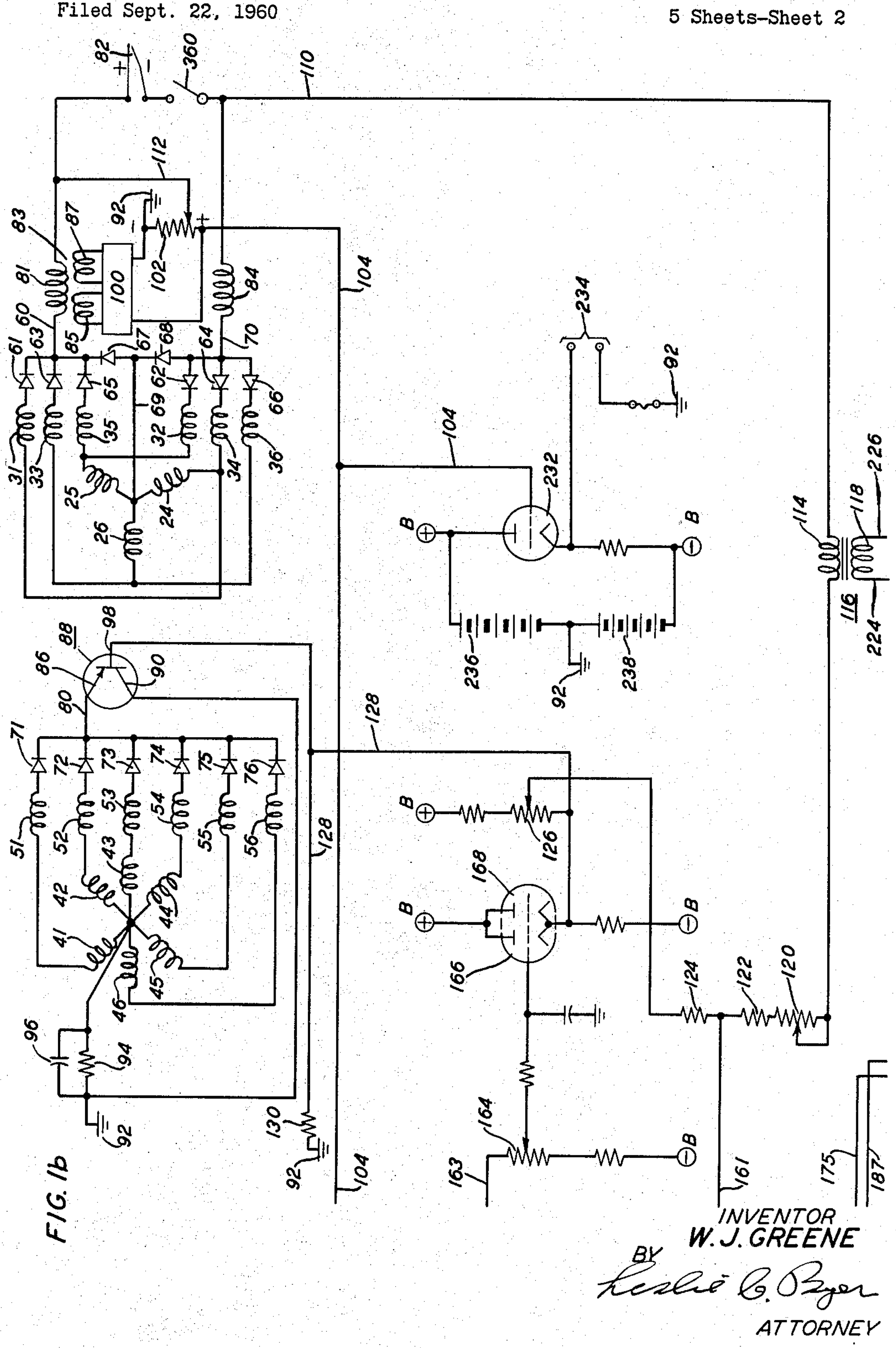

Referring to FIG. 1*b*, the principal parts of a magnetic amplifier-rectifier to which the invention is illustrated as being applied are shown, including a three-phase power secondary comprising phase windings 24, 25, 26, and a six-phase control secondary comprising phase windings 41 through 46. These groups of secondary windings may each be star-connected and may be energized by a suitable power primary comprising, for example, a set of three-phase delta-connected phase windings (not shown) coupled in known manner to both secondaries. To the outer end of power winding 24 may be connected a pair of saturable reactor power windings 31 and 34; to the outer end of power winding 25, saturable reactor power windings 32 and 35; and to the outer end of power winding 26, saturable reactor power windings 33 and 36. To the outer ends of control windings 41 through 46 may be conected saturable reactor control windings 51 through 56, respectively. Saturable reactor power windings 31, 33, 35 are connected in parallel through individual unidirectional conductors, rectifiers or diodes 61, 63, 65, respectively, to a positive load line 60, and saturable reactor power windings 32, 34, 36 are connected in parallel through individual unidirectional elements 62, 64, 66, respectively, to a negative load line 70. Saturable reactor control windings 51 through 56 are connected through individual undirectional elements 71 through 76, respectively to a common positive control line 80. The load circuit is completed from the positive load line 60 through the primary winding 81 of a load current measuring transformer 83, a load device, shown as an electric arc 82, a switch 360 and a ripple-reducing inductor 84 to the negative load line 70. Diodes 67 and 68 may be connected as shown between the neutral line 69 of the power secondary and the load lines 60 and 70, respectively. The control circuit for the saturable reactors extends from the positive control line 80 to the emitter 86 of a transistor 88, through the collector electrode 90 of the transistor, to a signal ground 92, and thence through a parallel combination of a load resistor 94 and a by-pass capacitor 96 to the neutral or center connection of the control secondary, and thence through the presently active control secondary winding, saturable reactor control winding, and rectifier to the line 80. The transistor 88 is controlled by its base electrode 98. Windings 31 and 51 are coupled to an individual saturable core (not shown), in known manner, in such polarity that a control pulse through winding 51 has opposite magnetizing effect upon the core compared to the effect of a power pulse through winding 31. Winding pairs 32, 52; 33,53; 34 54; 35, 55; and 36, 56, are similarly related to other saturable cores (not shown) in known manner.

The magnetic amplifier rectifier may be of the improved type disclosed and claimed in my copending application Serial No. 51,107 filed August 22, 1960, entitled "Regulated Power Supplies."

A current measuring device 100, coupled to line 60 through a transformer 83 with primary winding 81 and secondary windings 85 and 87 develops in its output a voltage across a potentiometer 102 which voltage is proportional to the current in the load circuit, and serves to represent the component of voltage which the magnetic amplifier must provide to take care of the voltage drop across a series resistance R which is otherwise necessarily introduced into the load circuit in order that a monitoring and representative feedback indication may be obtained by means of which the magnetic amplifier may be controlled to provide current as called for by an operating program. A first feedback path, herein called the current feedback path, is provided from signal ground 92 at the upper terminal of the potentiometer 102, through this potentiometer, a current feedback line 104, a resistor 106 (FIG. 1*a*), and a potentiometer 108 back to signal ground 92.

To represent a component of voltage which the magnetic amplifier must provide to take care of the voltage drop across the load element (arc 82), a second feedback path, herein called the voltage feedback path, is provided over a voltage feedback line 110 which is connected to the negative terminal of the arc 82. The voltage fed back over the voltage feedback line may constitute simply the voltage across the arc 82, in which case the signal ground 92 cannot be used as one side of the voltage feedback circuit as it will be noted that signal ground is separated from the positive terminal of the arc 82 by a potential across the potentiometer 102, the lower terminal of the potentiometer 102 being connected to the positive side of the arc 82 by a line 112. It has been found more convenient and definitely advantageous to use the signal ground as a common conductor in the two feedback circuits, completing the voltage feedback circuit from signal ground 92, through potentiometer 102, line 112, arc 82, line 110, winding 114 of a transformer 116 (having a second winding 118), rheostat 120, resistors 122 and 124, potentiometer 126, line 128, and resistor 130 to signal ground 92. It will be found that a cancellation of effects takes place so that the inclusion of the series load potentiometer 102 in both the feedback paths in effect cancels out the resistance R.

The line 128, it will be shown later, serves to transmit the input control potentials to the magnetic amplifier, for which purpose the line 128 is extended to the base electrode 98 of the transistor 88.

A switch or relay contact 360 may be provided for connecting and disconnecting the load circuit as required for operating.

A command or external control (program control) signal may be impressed upon the system of FIG. 1 over an input line 134 (FIG. 1*a*).

The command signal may be continuously compared with a signal derived from the current feedback line 104 across the resistor 106 and the potentiometer 108, by means of a differential amplifier which may comprise triodes 136 and 138, which have their cathode circuits interconnected by a potentiometer 140. The line 134 is connected to the grid of the triode 136 and the current feedback signal is impressed upon the grid of triode 138 by way of a line 142 and a winding 144 of a transformer 146 (having a second winding 148). Unbalances between the triode circuits produce potential changes at the movable contact of the potentiometer 140 which are transmitted directly to the control grid of a pentode 150, the control grid potential of which affects its anode potential, which in turn affects the grid potential of a triode 152. The triode 152 functions as a cathode follower which is provided with two separate output connections.

One output of the cathode follower triode 152 is taken from a potentiometer 154, over a line 156 to one input of a differential amplifier or combining circuit comprising triodes 158 and 160, the line 156 being connected to the grid of the triode 158. The output of the combining circuit is taken from the anode of the triode 160, through a neon voltage regulator tube 162 and a potentiometer 164 (FIG. 1*b*) to the grids of a duplex cathode follower comprising twin triodes 166 and 168. An output of this cathode follower is connected to the transistor base control line 128.

A second output of the cathode follower triode 152 is taken across a cathode resistor 170. This output is applied to a resistance-capacitance analogue impedance comprising a rheostat 172 and a capacitor 174 in serial connection to signal ground 92 to represent the time constant of that portion of the actual load circuit composed of the equivalent current measuring resistance R and the inductance L of ripple-smoothing inductor 84. By means of a switch 176 a second rheostat 178 may be substituted for the rheostat 172 when it is desired to use a load circuit with a different time constant. A protective diode 180 may be provided in parallel with the capacitor 174, and the capacitor may be connected to signal ground 92 at the terminal remote from the rheostat 172.

Figure 1C:
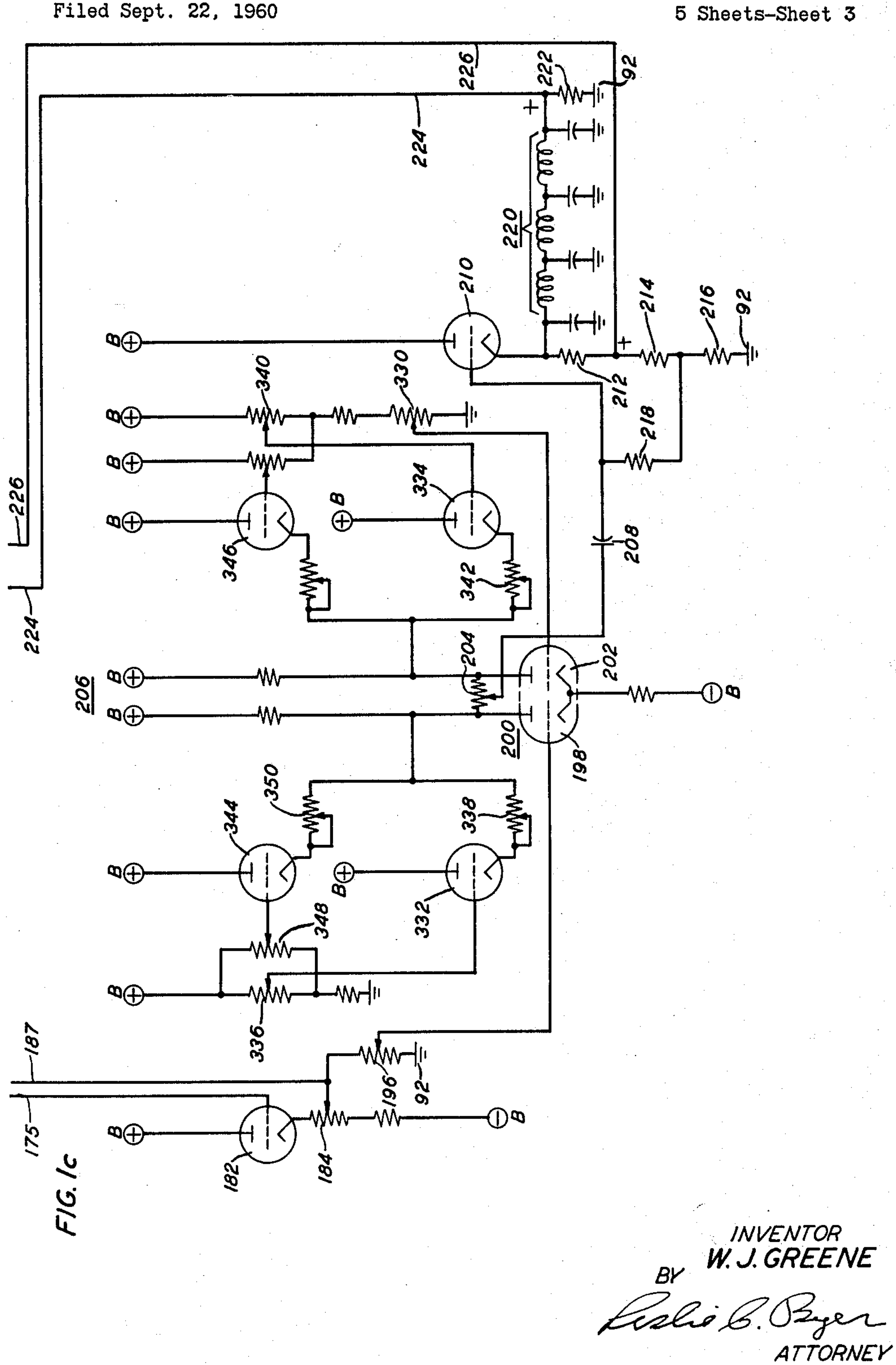

The voltage across the capacitor 174 is transmitted by conductor 175 to the grid of a cathode follower triode 182 (FIG. 1*c*), from which two outputs are taken.

One output from the triode 182 is taken directly from a cathode circuit potentiometer 184 and is impressed by conductor 187 upon the base electrode of transistor 186 (FIG. 1*a*) of a pair of normally balanced transistors 186 and 188. The emitter electrodes of the transistors 186 and 188 are connected to opposite ends of the transformer winding 148. The collector electrodes of the transistors are both connected to signal ground 92. Current is supplied to the transistors from a suitable source 190 the negative terminal of which is connected to signal ground 92. The supply circuits of the respective transistors include the current limiting resistors 192 and 194. The base electrode of the transistor 188 is connected to the movable arm of the potentiometer 108 in the current feedback circuit.

A second output from the cathode follower triode 182 is taken from the movable arm of the potentiometer 184 through another potentiometer 196 to the grid of a triode 198 in a differential amplifier 200, which includes a second triode 202. The output of the amplifier 200 is taken from a potentiometer 204 which is connected between the respective anodes of the triodes 198 and 202. An analogue circuit 206 is connected to the anodes of the triodes 198 and 202 to represent departures of the resistance of the load device (arc 82) from a constant resistance value. The output of the amplifier 200 is connected through a capacitor 208 to the grid of a cathode follower triode 210.

Two separate outputs are taken from the cathode follower 210. One output is taken across voltage dividing resistors 212, 214 and 216 to a delay line 220. The delay line is terminated in a resistor 222. In parallel with the resistor 222 a circuit extends through a line 224, the transformer winding 118, a line 226, and the resistors 214 and 216 to signal ground 92. Another output is taken across the resistors 214 and 216 through line 226, winding 118 (in opposition to the first mentioned output), line 224 and resistor 222 to signal ground 92. A resistor 218 is connected between the grid of the triode 210 and the junction of resistors 214 and 216.

A second output from the cathode follower pair 166, 168 (FIG. 1*b*) is taken from the movable arm of the potentiometer 126 and impressed through adding resistor 124 upon the grid of the triode 160 of the combining triode pair 158, 160 (FIG. 1*a*). A second input for the grid of triode 160 is taken from the voltage feedback line 110 (FIG. 1*b*) through rheostat 120 and adding resistor 122.

A monitoring cathode follower triode 232 may be provided for observing the wave form or measuring the amplitude of the current feedback wave. The grid of the triode 232 is connected to the current feedback line 104. The output may be obtained between the cathode and signal ground at the terminal pair 234.

All points marked B+ in the figures are to be connected in common to the positive terminal of a battery or other suitable direct current source 236 the negative terminal of which is connected to signal ground 92. All points marked B− in the figures are to be connected in common to the negative terminal of a similar source 238 the positive terminal of which is connected to signal ground. For clarity in the drawings, the sources 236 and 238 are shown connected to the points B+ and B− in the circuit of the triode 232 only.

Figure 2:
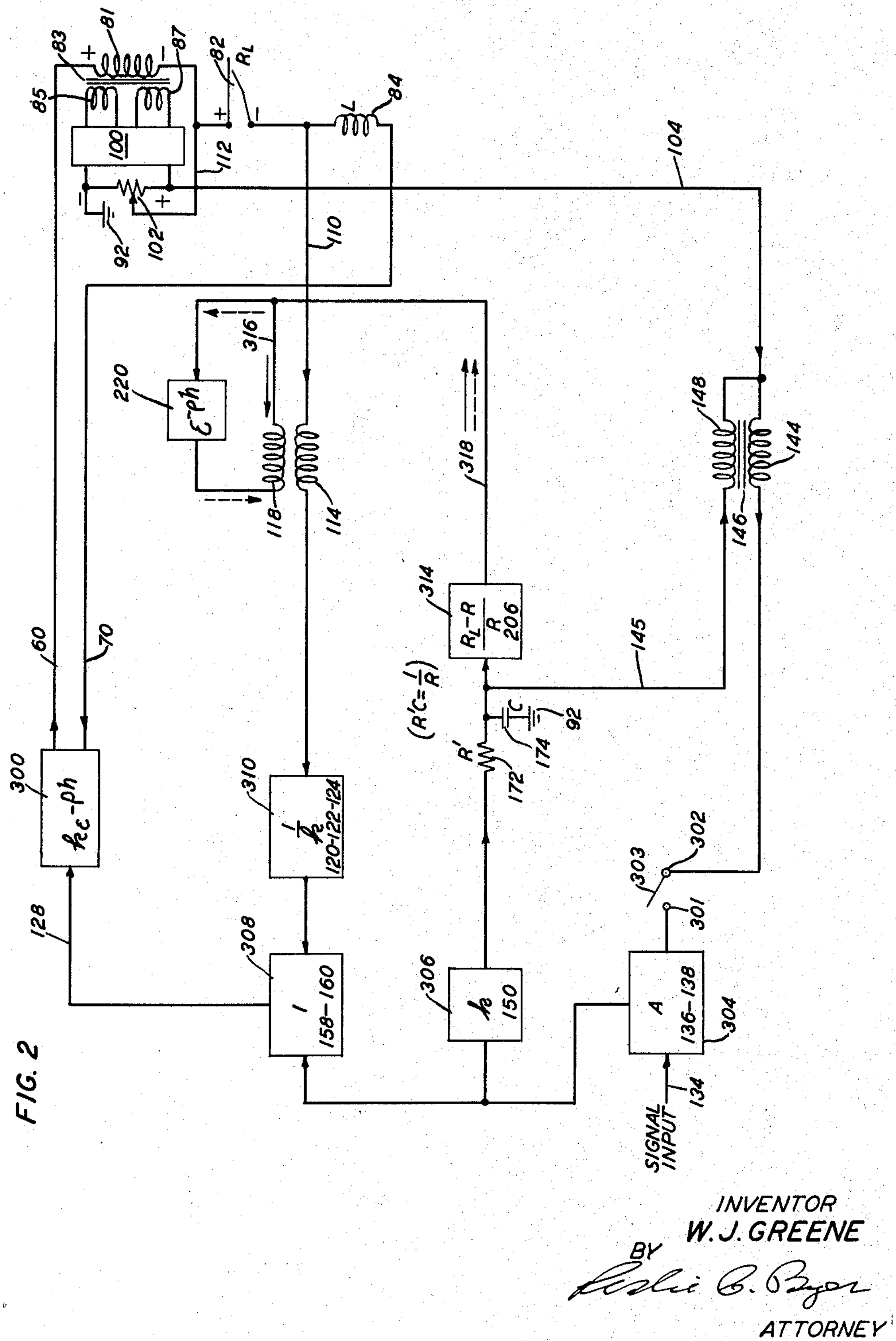
FIG. 2 is an operational schematic diagram of the feedback system of FIGS. 1*a*, 1*b* and 1*c*.

FIG. 2 shows the main features of the system of FIG. 1 in operational schematic form. The system shown in FIG. 2 comprises a negative feedback loop circuit, broken open arbitrarily between an input terminal 301 and an output terminal 302 to aid in visualizing the overall gain of the amplifier. In actual operation, the gap between the terminals 301 and 302 is closed, as by means of a switch 303, or by a permanent connection.

The system illustrated in FIG. 1 or FIG. 2 provides direct current signals or unidirectional pulses which are a measure of the load current. These signals are compared to the signal referred to herein as the signal input, which is a control command signal employed to set up any desired value of load current within the limits of the system. The difference between the feedback signal and the signal input is used to alter the excitation of the power supply unit to supply the desired load current, whereupon the feedback signal is altered to correspond to the value of the signal input.

Figure 3:
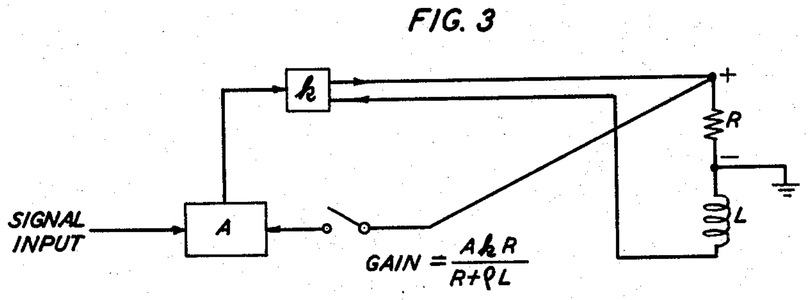
FIG. 3 is an operational schematic of a feedback system which is the equivalent of the system of FIG. 2 with respect to gain.

An object in using the negative feedback system in the form shown is to stabilize the control circuit against instability due to time lag in various parts of the system causing the feedback to become positive under certain conditions, so that the feedback signal tends to add to the input rather than to subtract therefrom. A magnetic amplifier such as is embodied in the system shown may have a time delay of response to demanded change in load current of about one-half cycle of the power line frequency. This means that any signal varying at about the line frequency (for example, 60 cycles per second) at the input would be compared to a feedback signal which has been delayed by one-half cycle and, hence, the feedback signal would cause the output to deviate further from the desired level by adding to the input signal. The resultant condition is termed unstable or oscillatory. The purpose of the negative feedback in the present system is to nullify the effect of the time delay or dead time of the power supply system upon the stability of the control system. It may be demonstrated mathematically that the gain of the feedback system of FIG. 2 is equivalent to the gain of a much simpler feedback system, shown in FIG. 3, which does not involve the dead time of the magnetic amplifier. Furthermore, the load impedance is not involved in the determination of the gain of the system of FIG. 2 or FIG. 3. This means that the feedback system is not subject to instability such as may be caused by negative resistance in the load circuit, as is generally present in an electric arc circuit, especially at the lower current values.

Referring to FIG. 2, the magnetic amplifier with amplification factor $k$ and dead time H is shown at 300. A differential amplifier 304, comprising thermionic tubes 136 and 138 (FIG. 1) is provided for comparing the signal input on line 134 with a current feedback signal when the switch 303 is closed. Any output from the amplifier 304, due to unbalance between the input signal and the current feedback signal is passed through an electronic amplifier 306 comprising thermionic tube 150, which responds without appreciable time lag relatively to the dead time or time lag of the magnetic amplifier 300. The output from the amplifier 306 is impressed upon the analogue circuit comprising the resistor 172 and capacitor 174 which represent the time constant of the equivalent current measuring resistance R and ripple-reducing inductance L of the load circuit of the magnetic amplifier. The output from the amplifier 304 is also impressed upon a voltage combining circuit 308 comprising thermionic tubes 158 and 160. The circuit 308 combines the voltage received from amplifier 304 with a voltage received from the voltage feedback line 110 by way of the transformer winding 114 and an attenuating network 310. The output of the combining circuit 308 is impressed upon the line 128 and constitutes the input signal for the magnetic amplifier. The output circuit of the magnetic amplifier 300 passes through the positive load line 60, the primary winding 81 of the line current measuring transformer 83, the arc 82 or other load device, the ripple-reducing inductor 84 and back to the magnetic amplifier through the negative load line 70. The current feedback signal is obtained from the current measuring device 100 across the potentiometer 102 the negative terminal of which is grounded at 92. The current feedback signal passes over the feedback line 104, through the transformer winding 144 and switch 303 to the differential amplifier 304. During the dead time of the magnetic amplifier, the analogue circuit 172, 174 furnishes current and voltage feedback signals so that the control system for the magnetic amplifier does not have to wait for the magnetic amplifier to change its state. The transient current feedback signal from the analogue circuit passes over a line 145 and through the transformer winding 148, inducing a signal in the winding 144, which signal is applied to the differential amplifier 304. The transient voltage feedback signal is passed through a second analogue circuit 314, which represents the portion of the load circuit between ground 92 and the negative terminal of the arc 82. This portion of the load circuit includes the arc resistance $R_L$ minus the equivalent measuring resistance R. The transient voltage feedback signal passes over lines 318 and 316 through transformer winding 118, inducing a signal in winding 114 which is applied to the attenuating network 310 and thence to the combining circuit 308. After the dead time *h*, the magnetic amplifier changes its output in response to the change in the input on line 128. The pulse due to the change in output from the magnetic amplifier, passes through the winding 144, taking the place of the transient pulse induced by the winding 148. Also at that time, a delayed current from the analogue circuit 314 completes a passage through the line 318, the delay circuit 220 of delay time *h*, and through winding 118 in opposite direction to the earlier established current through that winding, nullifying the earlier established current. At this time, the voltage feedback on line 110 from the actual load circuit changes value, superseding the transient voltage feedback induced by the winding 118.

A more detailed description will now be given of some of the illustrative components shown in FIG. 1.

The differential amplifier comprising tubes 136 and 138 operates in response to a negative-going signal on the grid of tube 136 and a positive-going signal on the grid of tube 138. When the signals on the respective grids are opposite in sign and approximately equal, a normal operating output position may be determined on potentiometer 140 such that the grid of the pentode 150 assumes a suitable normal potential. If the grid of tube 136 becomes more positive, the grid of tube 150 becomes more positive. If the grid of tube 138 becomes more negative, the grid of tube 150 becomes more negative.

A demand for full load current in the arc may be represented by a negative potential of, for example −7 volts on the grid of tube 136, a demand for no load being represented by ground potential on the grid of tube 136. Full load current in the arc may be reported by means of a positive potential, in this example +7 volts on the grid of tube 138 and no-load condition by means of ground potential. Then, when the arc is at no-load and the input signal is calling for full load, the grid potentials of tubes 136 and 138 differ by 7 volts. This voltage difference is in such direction as to cause a lowering of the grid voltage of tube 150, raising the potential of the anode of tube 150 and the grid of tube 152. The grid of tube 152 is normally at ground potential as is also the cathode of tube 152. When the grid and cathode of tube 152 are raised above ground by tube 150, the capacitor 174 in the analogue circuit begins to charge toward the positive potential of the cathode of tube 152.

Clamping diodes 320 and 322 may be provided in the grid circuit of tube 152 to confine the potential of the signal on this grid within desired limits above and below ground potential in known manner.

When the demand is for lower current, the voltage difference between the grids of tubes 136 and 138 results in a raising of the grid potential of tube 150, lowering the anode potential of tube 150 and lowering the grid and cathode potentials of tube 152. When this occurs, the capacitor 174 in the analogue circuit begins to discharge toward the lowered cathode potential of tube 152.

Because the time constant of the R′–C analogue circuit may be made equal to the time constant of the L–R circuit in the output of the magnetic amplifier, the voltage across the analogue capacitor 174 may be made to anticipate changes in the current in the load circuit of the magnetic amplifier. The input of the magnetic amplifier may then be controlled with reference to the potential of the analogue capacitor without waiting for the magnetic amplifier to change its state and for the change of state to be reported over the current feedback line from the load circuit.

The second output from the tube 152, taken from the potentiometer 154, is impressed upon the grid of tube 158. Tubes 158 and 160 are cathode-coupled as a conventional differential amplifier. The signal on the grid of tube 158 is a positive signal while the signal on the grid of tube 160 is essentially a negative signal. The differential amplifier develops an output signal which is the sum of the absolute values of the two signals.

A call for increased load current has been shown to raise the cathode potential of tube 152. Hence, the grid potential of tube 158 is likewise raised, increasing the current in tube 158 and decreasing the current in tube 160. The presence of an increased negative potential on the grid of tube 160, calling for an increase in voltage across the arc also tends to decrease the current in tube 160. The combined result of the inputs on the tubes 158 and 160 is to raise the anode potential of tube 160 and to raise the grid and cathode potentials of tubes 166 and 168. Raising the potential of the cathodes of tubes 166 and 168 raises the voltage on line 128 and at the base 98 of transistor 88 which regulates the control current fed to the saturable cores in the magnetic amplifier, reducing the amount of the control current and thereby increasing the output voltage of the magnetic amplifier and increasing the load current from the magnetic amplifier. When decreased load current is called for, the system acts to decrease the voltage output of the magnetic amplifier in a manner that will now be evident.

The transient current feedback system employs a normally balanced pair of transistors 186, 188. When these transistors become temporarily unbalanced, a pulse of current is sent through the transformer winding 148, inducing a pulse in winding 144, which latter pulse is impressed upon the grid of tube 138. Balance occurs whenever the bases of the respective transistors are at equal potentials. In the unbalanced state of the circuit, one or the other of the transistors 186, 188, sends current through the winding 148. When an increase in load current is first called for, there is no immediate change in the current feedback on line 104. The base of transistor 188 is controlled by the old value of load current and will be so controlled throughout the dead time of the magnetic amplifier. The base of transistor 186 during this dead time is controlled by the instantaneous value of potential on the analogue capacitor 174 by way of the circuit of the cathode follower tube 182. The potential of the capacitor 174 runs its course from a value representative of the old value of load current to a final value representative of the new load current called for by the input signal on line 134, in an interval equal in duration to the dead time of the magnetic amplifier. At the end of this interval, the load current of the magnetic amplifier changes suddenly, putting a new value of feedback potential upon the line 104. This value of feedback potential, reduced in resistor 106 and potentiometer 108 is impressed upon the base of transistor 188 and is adjusted so that it just balances the potential applied to the base of transistor 186 from the analogue capacitor, thereby cutting off the transient feedback generated in the analogue circuit and substituting therefor the feedback from the actual load circuit.

Figure 4:
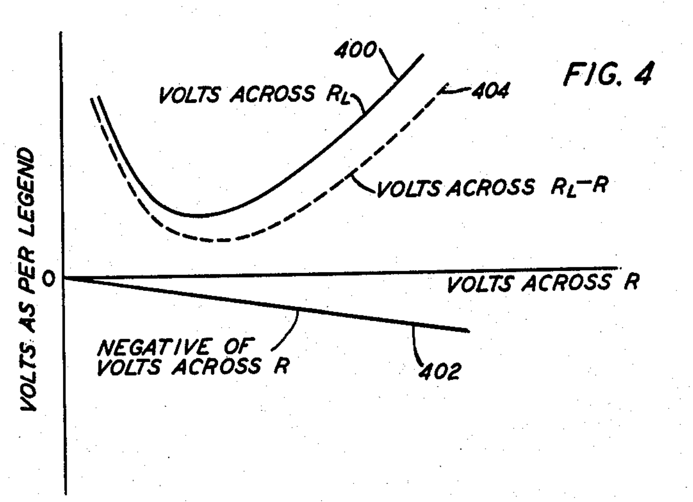
FIG. 4 is a graph of a set of voltage characteristic curves from which an analogue circuit may be designed for use in the feedback system of FIG. 1 or FIG. 2.

It is known that a load device of the type such as an electric arc is of variable resistance depending upon the current that it draws. The usual arc characteristic exhibits a negative resistance at low currents, flattening off and then presenting a positive resistance at higher currents. FIG. 4 shows a typical characteristic curve 400 for an electric arc. The shape of the curve 400 is the same as is obtained when voltage across the arc is plotted as ordinate with arc current as abscissa. In FIG. 4, however, the arc current is plotted as volts across the equivalent measuring resistor R, which is proportional to the load current which is the arc current in this case. It will be evident that the arc voltage is determined by the arc current according to a relationship such as is shown by the curve 400.

The negative of the voltage across the equivalent measuring resistor R is shown by the line 402, plotted upon the same vertical scale as the curve 400. The value of $R_L$–R is given by dotted curve 404.

To provide the transient voltage feedback, which will represent the voltage across the series combination of $R_L$ and minus R, a signal proportional to the voltage across R is impressed upon the input of the analogue circuit 206 and is converted by the analogue circuit into an output signal proportional to the voltage across $R_L$–R. To accomplish this conversion, the analogue circuit 206 is designed to provide a ratio of $R_L$–R to R between its output voltage and its input voltage.

The analogue circuit 206 employs the cathode coupled tubes 198 and 202 with the potentiometer 204 connected between the respective anodes. An input signal which is derived from the voltage across the analogue capacitor 174 and is transmitted by way of the cathode follower tube 182 and potentiometers 184 and 196, represents the voltage across the measuring resistor R and is applied to the grid of tube 198. The output proportional to $R_L$–R is taken from the movable arm of potentiometer 204. When a change occurs in the anode current of either tube, a portion of the anode current is variably shunted through the potentiometer 204. The changes in anode current occur under the control of the grid potential on tube 198. Since the tubes 198 and 202 are strongly coupled together through their cathode circuits, the sum of the anode currents of the tubes is maintained substantially constant. Therefore, when a rise in the grid potential of tube 198 causes the current in tube 198 to increase, the current in tube 202 decreases correspondingly, and when a drop in the grid potential of tube 198 causes the current in tube 198 to decrease, the current in tube 202 increases. The grid of tube 202 need not be varied, and is kept at a constant potential by means of a potentiometer 330 connected between B+ and ground 92.

Figure 5:
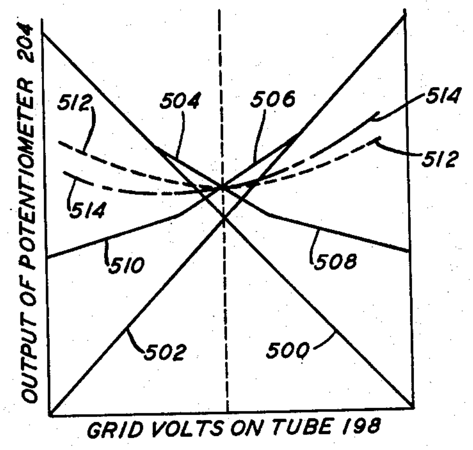
FIG. 5 is a set of graphs showing voltage characteristic curves of an analogue circuit based upon the curves shown in FIG. 4.

As the grid potential of tube 198 is varied from a low positive value to a high positive value, the anode potential of tube 198 increases, giving a falling output characteristic with grid voltage as illustrated by line 500 in FIG. 5. At the same time the tube 202 has a rising output characteristic as illustrated by line 502. A number of biased valve circuits may be provided which come into play at different anode voltages. These are used to alter the shape of the output characteristics of the tubes 198 and 202 to simulate the output characteristic of the circuit for which the analogue is required.

Tubes 332 and 334 are connected to the anode circuits of tubes 198 and 202, respectively. Tube 332 is grid biased by means of a potentiometer 336 and a cathode resistor 338 to become conductive when the anode potential of tube 198 falls for example to about 70 volts and is cut out at higher anode potentials. The tube 332 adds to the total output of the tube 198, producing a modified output characteristic line such as is shown at 504. The tube 334 is grid biased by a potentiometer 340 and a cathode resistor 342 to become conductive when the anode potential of tube 202 falls to about 70 volts and is cut out at higher anode potentials. The tube 334 produces a modified output characteristic curve such as is shown at 506.

Tubes 344 and 346 are likewise connected to the anode circuits of tubes 198 and 202, respectively. Tube 344 is grid biased by a potentiometer 348 and a cathode resistor 350 of larger resistance than resistor 338 to become conductive when the anode potential falls for example to about 50 volts. Tube 346 is similarly biased to come in at about 50 volts. Modified output lines due to the presence of tubes 344 and 346 are shown in FIG. 5 at 508 and 510, respectively. Curve 512 shows the approximate combined output of tubes 198 and 202 at the movable arm of potentiometer 204 when the arm is centered so that both tubes contribute equally to the sum of the output currents. The output characteristic may be altered in shape by selecting a point on potentiometer 204 other than the midpoint, so that the tubes contribute unequally to the total current, as shown for example in curve 514 which corresponds to a point on the potentiometer 204 about a quarter of the way from the left-hand end of the potentiometer. By suitable adjustment of the variable elements of the analogue circuit 206, the output characteristic of the type shown in FIG. 5 may be made to duplicate substantially the shape of the arc characteristic of the type exemplified by curve 404 in FIG. 4.

Since only transient effects are utilized, no direct current path is required in the output circuit of the amplifier 200. The presence of the capacitor 208 in this output circuit permits changes in output to be transmitted from the potentiometer 204 to the grid of tube 210, while at the same time the direct current potential at the anodes of tubes 198 and 202 may be materially different (higher) than the direct current potential at the grid of tube 210, so that optimum operating conditions may be maintained in the two circuits that are separated by the capacitor 208.

The signal ground 92 may be isolated from the true ground by means of a suitable capacitor, so that in a welding operation, for example, either the workpiece or the arc electrode may be at true ground potential, as desired.

While an illustrative form of apparatus and a method in accordance with the invention has been described and shown herein, it will be understood that numerous changes may be made without departing from the general principles and scope of the invention.

What is claimed is:

1. In a feedback controlled power supply, in combination, an amplifier having an input circuit and an output circuit and having a material delay time between the application of a wave to said input circuit and the appearance of an amplified wave in said output circuit in response to the said input wave, a first feedback path from a point in said output circuit to a point in said input circuit, an analogue circuit for simulating the electrical conditions in said output circuit, means to impress an input wave substantially simultaneously upon said input circuit and upon said analogue circuit, a second feedback path to the said input circuit from a point in said analogue circuit electrically equivalent to the point in said output circuit at which said first feedback path originates, and means associated with said second feedback path to disable said second path at the end of said delay time.

2. In a feedback controlled power supply, in combination, an amplifier having an input circuit and an output circuit and having a material dead time between the application of an input wave to said input circuit and the appearance of an amplified output wave in response to said input wave, a first feedback circuit from a point in said output circuit to a point in said input circuit, a delay circuit having a delay time equivalent to said dead time of the amplifier, an analogue circuit for simulating the electrical conditions in said output circuit, a second feedback path partially common to said first feedback path and extending from said analogue circuit independently of said delay circuit to said input circuit, a third feedback path from said analogue circuit to said input circuit by way of said delay circuit, and means to oppose said second and third feedback paths to each other so as to pass to said input circuit only the difference between signals in said two paths.

3. In a feedback controlled power supply, in combination, an amplifier having an input circuit and an output circuit and having a material dead time between the application of an input wave and the appearance of an amplified output wave in response to said input wave, a steady-state feedback system active after expiration of said dead time, an analogue circuit for simulating current changes in said output circuit in response to a given input signal, a transient feedback system operative in response to changes of condition in said analogue circuit to apply an input wave to said input circuit to produce a change in output current in said amplifier in response to said input signal, and means to limit the action of said transient feedback system to a period equal to said dead time after the occurrence of any change in condition of said analogue circuit.

4. In a feedback controlled power supply, in combination, an amplifier having an input circuit and an output circuit and having a material dead time between the application of an input wave and the response in the form of an output wave, a first steady-state feedback system responsive to the value of the output current of the amplifier, a first analogue circuit for simulating current changes in said output circuit in response to a given input signal, a first transient feedback system operative in response to changes of condition in said first analogue circuit to apply a first component of input wave to said input circuit to aid in producing a change in output current in said amplifier in response to said input signal, a second steady-state feedback system responsive to the value of voltage across the load of said amplifier, a second analogue circuit for simulating voltage-current relations in said load, a second transient feedback system operative in response to changes in condition in said second analogue circuit to apply a second component of input wave to said input circuit to further aid in producing a change in output current in said amplifier in response to said input signal, and means to limit the action of each said transient feedback system to a period of time equal to the dead time of the amplifier after the occurrence of any given change in the condition of the respective analogue circuit.

5. In a feedback controlled power supply, in combination, a load circuit including a current measuring device, a ripple reducing reactor, and a variable resistance load device, delayed steady-state current feedback means connected across said current measuring device, delayed steady-state voltage feedback means connected across a series opposing combination of said current measuring device and said load device, a first analogue circuit simulating the combination of said current measuring device and said ripple reducing reactor, a second analogue circuit simulating the ratio of voltage across the said series opposing combination of said current measuring device and said load device to the voltage across said current measuring device alone, transient current feedback means controlled by said first analogue circuit, transient voltage feedback means controlled by said first and second analogue circuits, means common to said delayed steady-state current feedback means and said transient current feedback means to compare said combined means with a program control signal, means to cut off said transient current feedback means at the end of the delay time of said delayed steady-state current feedback means, means controlled by said comparing means to actuate said first analogue circuit, means common to said delayed steady-state voltage feedback means and said transient voltage feedback means to combine the effects of the same, means to combine the output of said comparing means and the combined effect of said delayed steady-state and said transient voltage feedback means, and means to impress the output of said last-mentioned combining means upon an input control means of said feedback controlled power supply to control the same.

6. In a feedback controlled power supply, in combination, an amplifier having an input circuit and an output circuit and characterized by a material delay interval between the application of an input wave to said input circuit and the appearance of an amplified output wave in said output circuit in response to said input wave, an analogue circuit for simulating changes in the electrical condition of said output circuit in response to a given input wave, means operative without material delay to impress an input wave substantially simultaneously upon said input circuit and upon said analogue circuit, and a stabilizing feedback system responsive to changes of electrical condition in said analogue circuit, said feedback system being operative to control said amplifier during the said delay interval thereof.

7. In a feedback controlled power supply, in combination, an amplifier having an input circuit and an output circuit and having a material dead time between the application of an input wave and the appearance of an amplified output wave in response to said input wave, a steady-state feedback system active to stabilize said amplifier beginning at the expiration of said dead time, an analogue circuit for simulating changes in the electrical condition in said output circuit in response to a given input signal, means to impress an input signal substantially simultaneously upon the said input circuit and upon said analogue circuit, a transient feedback system operative in response to changes of electrical condition in said analogue circuit to stabilize said amplifier during said dead time, and means to limit the action of said transient feedback system to a period equal to said dead time immediately following the occurrence of any change in the electrical condition of said analogue circuit.

8. In a feedback controlled power supply, in combination, an amplifier having an input circuit and an output circuit and characterized by a material delay interval between the application of an input wave to said input circuit and the beginning of an amplified output wave in said output circuit in response to said input wave, a load element in said output circuit, said load element being characterized by a negative resistance over at least a portion of the range of current values which may occur therein, a first analogue circuit for simulating current changes in said load element in response to a given input wave applied to said amplifier input circuit, current feedback means responsive to current changes in said first analogue circuit, a second analogue circuit for simulating voltage changes in said load element in response to a given input wave applied to said amplifier input circuit, voltage feedback means responsive to voltage changes in said second analogue circuit, means operative without material delay to impress an input wave substantially simultaneously upon said amplifier input circuit and upon said first and second analogue circuits, and means actuated jointly by said current feedback means and by said voltage feedback means to control said amplifier during said delay interval.

References Cited in the file of this patent

UNITED STATES PATENTS 2,854,620 Steinitz ---------------- Sept. 30, 1958